(12) United States Patent
Murray et al.

(10) Patent No.: US 7,426,384 B2
(45) Date of Patent: Sep. 16, 2008

(54) NETWORK COMMUNICATION SYSTEM INCLUDING A DATABASE OF CODES AND CORRESPONDING TELEPHONE NUMBERS

(75) Inventors: Richard Murray, Oxford (GB); Nick Hudson, Newbury (GB)

(73) Assignee: Vodafone Group PLC, Berkshire (GB)

( * ) Notice: Subject to any disclaimer, the term of this patent is extended or adjusted under 35 U.S.C. 154(b) by 469 days.

(21) Appl. No.: 11/180,882

(22) Filed: Jul. 13, 2005

(65) Prior Publication Data

US 2006/0040664 A1 Feb. 23, 2006

(30) Foreign Application Priority Data

Jul. 13, 2004 (GB) .................................. 0415650.1

(51) Int. Cl.
*H04M 11/00* (2006.01)
*H04M 3/42* (2006.01)

(52) U.S. Cl. .................... 455/414.1; 455/445; 455/403

(58) Field of Classification Search ................ 455/403, 455/414.1, 422.1, 426.1, 432.1, 432.3, 445, 455/448, 450, 458, 459; 379/219, 229, 225; 709/223, 226, 218, 249

See application file for complete search history.

(56) References Cited

U.S. PATENT DOCUMENTS

| | | | | |
|---|---|---|---|---|
| 6,079,020 A * | 6/2000 | Liu | ................ | 726/15 |
| 6,141,409 A * | 10/2000 | Madoch et al. | ......... | 379/270.02 |
| 6,173,399 B1 * | 1/2001 | Gilbrech | ..................... | 713/153 |
| 6,701,437 B1 * | 3/2004 | Hoke et al. | .................... | 726/15 |
| 6,741,693 B1 | 5/2004 | Madoch et al. | | |
| 6,751,308 B1 * | 6/2004 | Sahala | ........................ | 379/225 |
| 6,857,019 B1 * | 2/2005 | Sitaraman et al. | ........... | 709/225 |
| 6,915,436 B1 * | 7/2005 | Booth et al. | .................... | 726/3 |
| 6,920,487 B2 * | 7/2005 | Sofer et al. | .................. | 709/218 |
| 6,937,574 B1 * | 8/2005 | Delaney et al. | ............. | 370/254 |
| 7,072,964 B1 * | 7/2006 | Whittle et al. | ............... | 709/226 |
| 7,231,431 B2 * | 6/2007 | Sofer et al. | .................. | 709/218 |
| 2001/0005414 A1 | 6/2001 | Madoch et al. | | |
| 2003/0050076 A1 | 3/2003 | Wantanabe | | |
| 2004/0058692 A1 | 3/2004 | Kall et al. | | |

FOREIGN PATENT DOCUMENTS

| | | |
|---|---|---|
| EP | 1 113 661 A2 | 7/2001 |
| EP | 1 301 052 A3 | 4/2003 |
| GB | 2 367 213 A | 3/2002 |
| GB | 2376845 A | 12/2002 |

(Continued)

*Primary Examiner*—Sonny Trinh
(74) *Attorney, Agent, or Firm*—Workman Nydegger

(57) ABSTRACT

This disclosure concerns systems and methods for network communications. In one example, the method includes: providing subscriber terminals of each network with a respective publicly-known telephone number for allowing communications to be addressed to each subscriber terminal; associating selected subscriber terminals of each network together in a group such that those subscriber terminals can address communications to one another using a respective code allocated to each of the selected subscriber terminals; and, maintaining a database of the codes and corresponding publicly-known telephone numbers of all of the networks and providing to one of the networks a publicly-known telephone number corresponding to a code of a subscriber terminal of another one of the networks to allow communication from a subscriber terminal of one of the networks to be addressed to a subscriber terminal of the other of the networks using the code of the latter subscriber terminal.

22 Claims, 11 Drawing Sheets

FOREIGN PATENT DOCUMENTS

| | | |
|---|---|---|
| GB | 2 387 069 A | 10/2003 |
| WO | WO 03/032618 A1 | 4/2003 |
| WO | WO 03/032656 A1 | 4/2003 |
| WO | WO 03/096628 A1 | 11/2003 |
| WO | WO 03/098959 A1 | 11/2003 |
| WO | WO 04/002051 A3 | 12/2003 |

* cited by examiner

| IN 18 | | | |
|---|---|---|---|
| VPN X | | VPN Y | |
| Code No. | MSISDN/Telephone No. | Code No. | MSISDN/Telephone No. |
| 0 | 0207 225 1000 | 100 | 07772 654 100 |
| 4573 | 07771 225 4573 | 101 | 07772 654 101 |
| 4574 | 07771 225 4574 | 102 | 07772 654 102 |
| 4575 | 07771 225 4575 | 103 | 07772 654 103 |
| . . . | . . . | 104 | 07772 654 104 |
| 4965 | 07771 225 4965 | 105 | 07772 654 105 |
| 4990 | +49 89 2399 4990 | 106 | 07772 654 106 |
| 4491 | +49 89 2399 4991 | 107 | 07772 654 107 |
| . . . | . . . | . . . | . . . |

| IMP SYSTEM DATABASE 32 ||||||||
| VPN X$_A$ || VPN Y$_A$ || VPN M$_B$ || VPN N$_B$ ||
| Code No. | MSISDN/ Telephone No. | Code No. | MSISDN/ Telephone No. | Code No. | MSISDN/ Telephone No. | Code No. | MSISDN/ Telephone No. |
|---|---|---|---|---|---|---|---|
| 1 44 0 | +44 207 225 1000 | 5 44 100 | +44 7772 654 100 | 2 49 12340 | +49 65 4521 2340 | 4 49 1 | +49 33 1241 0001 |
| 1 44 4573 | +44 7771 225 4573 | 5 44 101 | +44 7772 654 101 | 2 49 12341 | +49 65 4521 2341 | 4 49 2 | +49 33 1241 0002 |
| 1 44 4574 | +44 7771 225 4574 | 5 44 102 | +44 7772 654 102 | 2 49 12342 | +49 65 4521 2342 | 4 49 3 | +49 33 1241 0003 |
| 1 44 4575 | +44 7771 225 4575 | 5 44 103 | +44 7772 654 103 | 2 49 12343 | +49 65 4521 2343 | 4 49 4 | +49 33 1241 0004 |
| ... | ... | 5 44 104 | +44 7772 654 104 | 2 49 12344 | +49 65 4521 2344 | 4 49 5 | +49 33 1241 0005 |
| 1 44 4965 | +44 7771 225 4965 | 5 44 105 | +44 7772 654 105 | 2 49 12345 | +49 65 4521 2345 | 4 49 6 | +49 33 1241 0006 |
| 1 44 4990 | +49 89 2399 4990 | 5 44 106 | +44 7772 654 106 | 2 49 12346 | +49 65 4521 2346 | 4 49 7 | +49 33 1241 0007 |
| 1 44 4991 | +49 89 2399 4991 | 5 44 107 | +44 7772 654 107 | 2 49 12347 | +49 65 4521 2347 | 4 49 8 | +49 33 1241 0008 |
| ... | | ... | | ... | | ... | |

| IN 18A DATA ||||||||
| --- | --- | --- | --- | --- | --- | --- | --- |
| VPN X_A ||| VPN Y_A ||| VPN M_B ||
| Code No. | MSISDN/Telephone No. | Code No. | MSISDN/Telephone No. | Code No. | MSISDN/Telephone No. | Code No. | MSISDN/Telephone No. |
| 0 | 0207 225 1000 | 100 | 07772 654 100 | 2 49 12340 | +49 65 4521 2340 | 4 49 1 | +49 33 1241 0001 |
| 4573 | 07771 225 4573 | 101 | 07772 654 101 | 2 49 12341 | +49 65 4521 2341 | 4 49 2 | +49 33 1241 0002 |
| 4574 | 07771 225 4574 | 102 | 07772 654 102 | 2 49 12342 | +49 65 4521 2342 | 4 49 3 | +49 33 1241 0003 |
| 4575 | 07771 225 4575 | 103 | 07772 654 103 | 2 49 12343 | +49 65 4521 2343 | 4 49 4 | +49 33 1241 0004 |
| ... | ... | 104 | 07772 654 104 | 2 49 12344 | +49 65 4521 2344 | 4 49 5 | +49 33 1241 0005 |
| 4965 | 07771 225 4965 | 105 | 07772 654 105 | 2 49 12345 | +49 65 4521 2345 | 4 49 6 | +49 33 1241 0006 |
| 4990 | +49 89 2399 4990 | 106 | 07772 654 106 | 2 49 12346 | +49 65 4521 2346 | 4 49 7 | +49 33 1241 0007 |
| 4491 | +49 89 2399 4991 | 107 | 07772 654 107 | 2 49 12347 | +49 65 4521 2347 | 4 49 8 | +49 33 1241 0008 |
| ... | | ... | | ... | | ... | |

FIG. 10

| IN 18A DATA | | | | | | | |
|---|---|---|---|---|---|---|---|
| VPN X<sub>A</sub> | | VPN Y<sub>A</sub> | | VPN X<sub>B</sub> | | VPN Y<sub>B</sub> | |
| Code No. | MSISDN/ Telephone No. | Code No. | MSISDN/ Telephone No. | Code No. | MSISDN/ Telephone No. | Code No. | MSISDN/ Telephone No. |
| 0 | 0207 225 1000 | 100 | 07772 654 100 | 49 60 | +49 65 4521 2340 | 49 1 | +49 33 1241 0001 |
| 4573 | 07771 225 4573 | 101 | 07772 654 101 | 49 61 | +49 65 4521 2341 | 49 2 | +49 33 1241 0002 |
| 4574 | 07771 225 4574 | 102 | 07772 654 102 | 49 62 | +49 65 4521 2342 | 49 3 | +49 33 1241 0003 |
| 4575 | 07771 225 4575 | 103 | 07772 654 103 | 49 63 | +49 65 4521 2343 | 49 4 | +49 33 1241 0004 |
| ... | ... | 104 | 07772 654 104 | 49 64 | +49 65 4521 2344 | 49 5 | +49 33 1241 0005 |
| 4965 | 07771 225 4965 | 105 | 07772 654 105 | 49 65 | +49 65 4521 2345 | 49 6 | +49 33 1241 0006 |
| 4990 | +49 89 2399 4990 | 106 | 07772 654 106 | 49 66 | +49 65 4521 2346 | 49 7 | +49 33 1241 0007 |
| 4491 | +49 89 2399 4991 | 107 | 07772 654 107 | 49 67 | +49 65 4521 2347 | 49 8 | +49 33 1241 0008 |
| ... | | | | ... | | ... | ... |

FIG. 11

NETWORK COMMUNICATION SYSTEM INCLUDING A DATABASE OF CODES AND CORRESPONDING TELEPHONE NUMBERS

CROSS-REFERENCE TO RELATED APPLICATIONS

This Application claims the benefit of United Kingdom Patent Application No: GB 0415650.1 entitled COMMUNICATIONS SYSTEMS, filed Jul. 13, 2004, which is incorporated herein in its entirety by this reference.

BACKGROUND OF THE INVENTION

1. The Field of the Invention

The present invention relates to a communications system including a plurality of telecommunications networks. The networks provide subscriber terminals with publicly-known telephone numbers. Each network allows selected subscriber terminals registered therewith to be associated together in a group (for example a private dialing plan or virtual private network (VPN)). This may enable those subscriber terminals to address communications to one another using a respective code allocated to each of the selected subscriber terminals. For example, this can be a short dialing code or a code corresponding to an extension number also used for making internal telephone calls on a fixed telephone network.

2. The Background of the Invention

It is known for a mobile telecommunications network to provide selected (A subscribers (for example, those belonging to a particular organization or company) with a private dialing plan or VPN. The subscribers within the VPN can address communications to one another using a code which is different to the publicly-known telephone number allocated to each of the subscriber terminals. The code will typically be a short dialing code (for example, a four-digit code corresponding to the extension number of the user of the subscriber terminal in the fixed internal communications network of the organization). Further, or alternatively, subscriber terminals within the VPN may be provided with special services not available outside the VPN and may be charged by the mobile telecommunications network on a different basis from subscribers which are not in the VPN.

Whilst such arrangements are convenient, such systems only allow subscribers of the network hosting the VPN to access the VPN (that is, to be able to address calls to other subscriber terminals using the codes).

BRIEF SUMMARY OF EXEMPLARY EMBODIMENTS OF THE INVENTION

According to a first aspect of the present invention, there is provided a communications system including a plurality of telecommunications networks, each of which: provides subscriber terminals thereof with a respective publicly-known telephone number for allowing communications to be addressed to each subscriber terminal, allows selected subscriber terminals thereof to be associated together in a group such that those subscriber terminals can address communications to one another using a respective code allocated to each of the selected subscriber terminals, and includes means for translating the code of each of the selected terminals into the corresponding publicly-known telephone number thereof; wherein the system further includes means for maintaining a database of the codes and corresponding publicly-known telephone numbers for each of said networks and for providing to one of said networks a publicly-known telephone number corresponding to a code of a subscriber terminal of another one of said networks to allow communication from a subscriber terminal of said one of the networks to be addressed to a subscriber terminal of said other of the networks using the code of the latter subscriber terminal.

By providing the database of codes and corresponding publicly-known telephone numbers of each of the networks, this allows a subscriber terminal of one group (for example, a VPN) within one network to be able to address a terminal of another group (for example, another VPN) in another network using the code of that other terminal.

According to a second aspect of the present invention, there is provided a method of enabling communication between a plurality of telecommunications networks, the method including providing subscriber terminals of each network with a respective publicly-known telephone number for allowing communications to be addressed to each subscriber terminal, associating selected subscriber terminals of each network together in a group such that those subscriber terminals can address communications to one another using a respective code allocated to each of the selected subscriber terminals, and maintaining a database of the codes and corresponding publicly-known telephone numbers of all of said networks and providing to one of said networks a publicly-known telephone number corresponding to a code of a subscriber terminal of another one of said networks to allow communication from a subscriber terminal of said one of the networks to be addressed to a subscriber terminal of said other of the networks using the code of the latter subscriber terminal.

According to a third aspect of the present invention, there is provided a communications system including a plurality of telecommunications networks (A,B), and wherein the system provides subscriber terminals thereof with a respective publicly-known telephone number for allowing communications to be addressed to each subscriber terminal, allows selected subscriber terminals thereof to be associated together in respective groups, and includes means for determining whether a communication from a terminal is for a member of a particular one of said groups; and wherein the system further includes means for maintaining a database of the groups for each of said networks (A,B) and for enabling special charges and/or services to be provided for communications between members of the same group and/or members of different groups.

These and other aspects of exemplary embodiments of the present invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5 shows example data for two VPNs hosted by the network A of FIG. 1;

FIG. 9 shows examples of VPN data stored by the central VPN database;

FIG. 10 shows examples of data "pulled" by network A from the central VPN database stored by that network together with data for VPNs hosted by the network A;

FIG. 11 illustrates an alternative, but similar, arrangement to FIG. 10, where VPNs are separately identified.

DETAILED DESCRIPTION OF EXEMPLARY EMBODIMENTS

Figure 1:
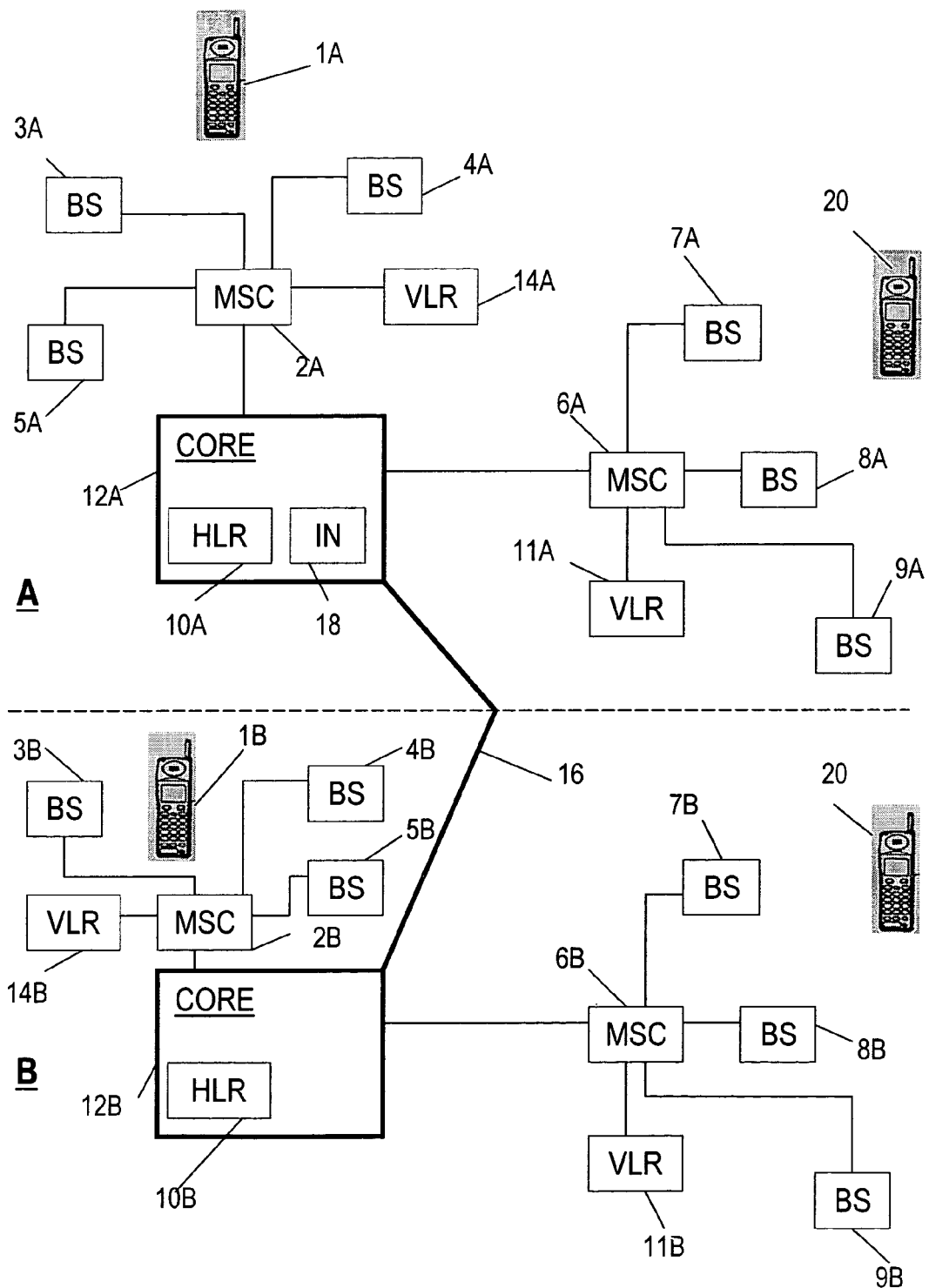
FIG. 1 is a diagrammatic drawing of two mobile telephone networks for use in explaining the operation of those networks, the "roaming" arrangements between the two networks, and how codes for a VPN are handled.

FIG. 1 diagrammatically explains the operation of two GSM networks between which there is a roaming agreement. Network A has the facility to provide a virtual private network (VPN) for groups of its subscribers. A group of subscribers in a VPN may be provided with additional facilities. For example, each subscriber in a VPN may be given a code number in addition to the conventional mobile telephone number (the MSISDN—Mobile Station International ISDN number). This code number will typically be of a fixed length and significantly shorter than an MSISDN. For example, the number may be a four digit number in the form of an extension number allocated in the telephone exchange of the organization for which the VPN is provided.

By providing the mobile terminals registered with the VPN with a code number corresponding to the extension number used by the organization for which the VPN is provided, the user of a mobile terminal can make and receive calls as if it were a standard fixed extension to the switchboard of the organization. The "conventional" MSISDN can also be used to make and receive calls from the mobile terminal.

In addition to or alternatively to simplifying the dialing of numbers between mobile terminals within the VPN, members of the VPN may be provided by the mobile telecommunications network with special call rates between members of the VPN. Special facilities may be provided to members of the VPN—for example, centralized billing to the organization, rather than the issuance of separate bills to each subscriber in the VPN.

The elements of the two mobile telecommunications networks, and their operation, will now briefly be described with reference to FIG. 1.

Each base station (BS) corresponds to a respective cell of its telecommunications network and receives calls from and transmits calls to a mobile terminal in that cell by wireless radio communication. Such a subscriber's mobile terminal is shown at 1A. The base stations are arranged in groups and each group of base stations is controlled by a mobile switching centre (MSC), such as MSC 2A for base stations 3A, 4A and 5A. As shown in FIG. 1, the network A has another MSC 6A, which is controlling a further three base stations 7A, 8A and 9A. In practice, the network A will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN. In addition, the mobile terminal 1A is a member of a VPN, and may also have a code number, as described above.

The network includes a home location register (HLR) 10A which, for each subscriber to the network, stores the IMSI and the corresponding MSISDN together with other subscriber data.

When the subscriber wishes to activate their mobile terminal in a network (so that it may make or receive calls subsequently), the subscriber places their SIM card in a card reader associated with the mobile terminal (terminal 1A in this example). The mobile terminal 1A then transmits the IMSI (read from the card) to the base station 3A associated with the particular cell in which the terminal 1A is located. The base station 3A then transmits this IMSI to the MSC 2A with which the BS 3A is registered.

MSC 2A now accesses the appropriate location in the HLR 10A present in the network core 12A and extracts the corresponding subscriber MSISDN and other subscriber data from the appropriate storage location, and stores it temporarily in a location in a visitor location register (VLR) 14A. In this way, therefore the particular subscriber is effectively registered with a particular MSC (MSC 2A), and the subscriber's information is temporarily stored in the VLR (VLR 14A) associated with that MSC.

Each of the MSCs of the network (MSC 2A and MSC 6A) has a respective VLR (14A and 11A) associated with it and operates in the same way as already described when a subscriber activates a mobile terminal in one of the cells corresponding to one of the base stations controlled by that MSC.

When the subscriber using mobile terminal 1A wishes to make a call, having already inserted the SIM card into the reader associated with this mobile terminal in the manner described, a call may be made by entering the telephone number of the called party in the usual way. This information is received by the base station 3A and is then routed to the called party via the MSC 2A. By means of the information held in the VLR 14A, MSC 6A can associate the call with a particular subscriber and thus record information for charging purposes.

Similarly, when a calling party (whether a subscriber within the network A or outside it) makes a call for the subscriber using mobile terminal 1A, MSC 2A is able to route this call to mobile terminal 1A via base station 3A using the information relating to that subscriber which is temporarily stored in VLR 14A.

The foregoing is intended to be merely a simplified description of the normal operation of the GSM network. In practice, other procedures will be carried out. In particular, an authentication procedure will take place when a subscriber activates a mobile terminal using their SIM.

Also shown in FIG. 1 is a second GSM network B. Items in network B corresponding to those in network A are similarly referenced, but with the suffix "B" instead of "A". Of course, the network "B" is likely to have a different arrangement and number of MSCs and base stations but operates in a similar manner to network A.

As explained above, for a subscriber to network A, the respective IMSI and MSISDN and other relevant data particular to that subscriber will be stored in HLR 10A. If that subscriber now roams to network B and activates a mobile such as MS 1B in that network, the procedure described above is substantially repeated.

Thus, the subscriber inserts their SIM card into the card reader of mobile terminal 1B. The mobile terminal 1B then transmits the IMSI from the card to the adjacent base station (3B) and thence to MSC 2B.

However, MSC 2B will now recognize, from the structure of the IMSI, that the subscriber is not a subscriber to network B but a subscriber to network A. Therefore, MSC 2B will access, via core 12B, HLR 10A instead of HLR 10B using the interconnection 16 between network A and network B. The subscriber's information, including the relevant MSISDN and other subscriber data, will be accessed and temporarily stored in the VLR 14B. All this information is thus ready for use in processing calls to or from mobile terminal 1B. Any charging information associated with any such calls can then be associated with the subscriber information in VLR 14B and eventually transmitted back to HLR 10A and then billed to the relevant subscriber.

If a calling party wishes to make a call to a visiting subscriber who is using mobile terminal 1B, the call would initially be routed to network A (because this network would be the network identified by the subscriber's publicly known telephone number which the calling party would use). The core 12A would interrogate HLR 10A which would thus produce an indication that a copy of the subscriber's data was temporarily stored in VLR 14B, indicating, of course, that the subscriber had roamed to network B. Via the link 16 between networks A and B, network A interrogates network B to request a "roaming number". This is in effect a temporary telephone number for the subscriber, being a number appropriate to network B. This roaming number can now be used to route the calling party's call to network B and thence to mobile terminal 1B. The calling party would of course not be aware of this roaming number or of the transferring process.

The foregoing description is merely a simplified description of the normal operation of the GSM network and roaming between GSM networks. Further details of all aspects of GSM networks and roaming are available in the ETSI Standards documentation.

As discussed above, in addition to the routing of calls using a conventional MSISDN, it is also known to allow selected subscribers of a mobile telecommunications network to form a VPN between them. The core 12A of network A includes an intelligent node (IN) 18 which stores the database of code numbers associated with respective MSISDNs. That is, the IN 18 comprises a look-up table or database, allowing the appropriate MSISDN corresponding to a particular code number to be identified, and vice versa.

If the user of mobile terminal 1A (who is a member of a VPN (VPN X)) administered by the core 12A of network A wishes to call another member of that VPN, the user dials the code number of that other mobile terminal. In this instance, the called mobile terminal is mobile terminal 20. Mobile terminal 20 is a member of the VPN X and has its MSISDN stored in IN 18 alongside that mobile terminal's code number ("4573" in this example). Because mobile terminal 20 is in the same VPN as mobile terminal 1A, the user of mobile terminal 1A need only dial the code number of mobile terminal 20.

Figure 2:
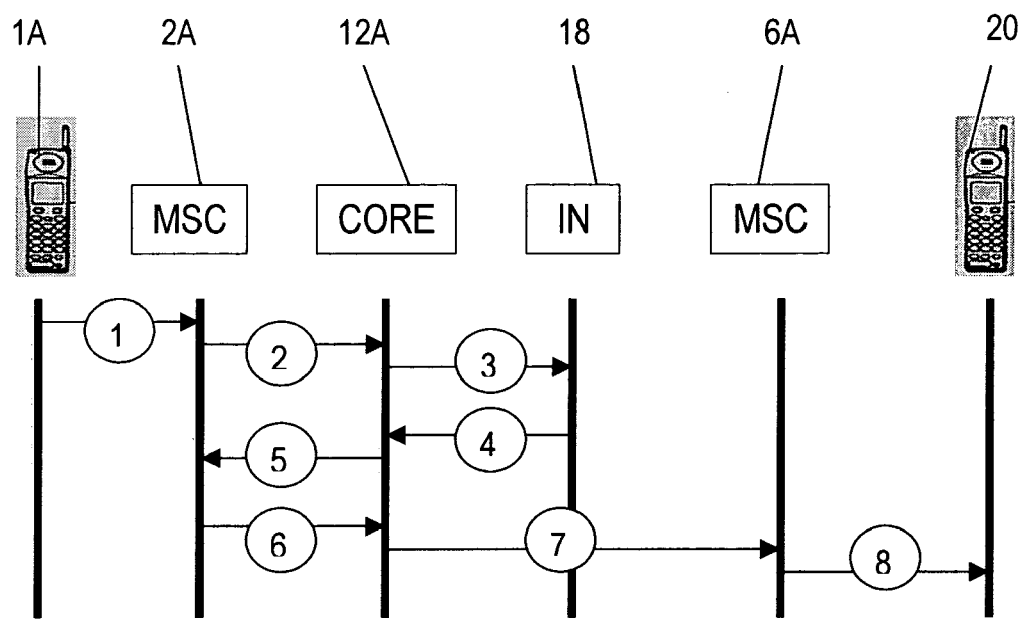
FIG. 2 shows the exchange of data between the elements shown in FIG. 1 when a subscriber to a VPN administered by a home network calls another subscriber in that VPN.

The data exchanges taking place during initiation of such a call are shown in FIG. 2. A call initiation message 1, which will include the code number dialed by the user of mobile terminal 1A, is transmitted wirelessly from mobile terminal 1A to MSC 2A. The initiation message is then transmitted from MSC2A to core 12A, typically by a wired or fixed connection (message 2). The initiation message includes a flag or other identifier which indicates that the call being initiated is for a call within a particular VPN (VPN X). This flag is identified by core 12A. On identification of the flag, the core 12A transmits the code number extracted from the initiation message to the IN 18 (message 3). The IN 18 then consults the look-up table or database present therein and obtains the MSISDN corresponding to the code number—in this example, "077712254573". The MSISDN is returned to the core 12A (message 4), and is transmitted from the core 12A to the MSC 2A (message 5). The MSC 2A then modifies the call initiation message to include the MSISDN of the called mobile terminal 20 in place of the code number. The modified call initiation message is then transmitted to the core 12A (message 6), where it is handled in a similar manner to any other telephone call dialed using a conventional MSISDN. However, the flag indicating that the call is between members of VPN X is used by the core 12A to identify and make available any special services which it has been agreed by the network will be provided to members of the VPN X, and also to charge for the call according to the charging structure agreed for members of the VPN X. The modified call initiation message is then transmitted from core 12A to the MSC 6A connected to the BS 7A serving the mobile terminal 20 (message 7). The call initiation message is then passed by the MSC 7A to the mobile terminal 20 (message 8), whereafter the telephone call between mobile telephones 1A and 20 can proceed in the conventional manner.

Figure 3:
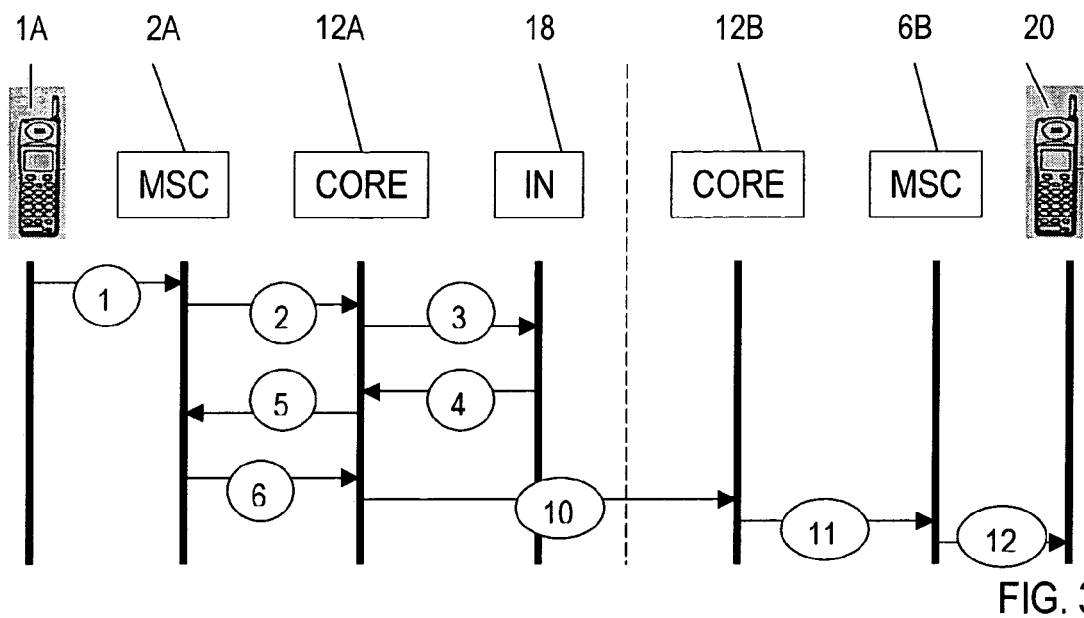
FIG. 3 shows the exchange of data between the elements shown in FIG. 1 when a subscriber to a VPN administered by home network calls a subscriber in that VPN that is "roaming"

If the mobile terminal 20 is roaming in network B, and is therefore served by base station 7B, MSC 6B and VLR 11B (FIG. 1), it may be still possible for the call to be routed to the mobile terminal 20 by dialing the code number at terminal 1A. That mobile terminal 20 is roaming in network B is recorded in HLR10A in the manner described above. FIG. 3 shows the messages exchanged between the elements shown in FIG. 1 during call initiation. Messages 1 to 6 are the same as those messages described in relation to FIG. 2.

When message 6, initiating the call between mobile terminal 1A and mobile terminal 20 is received by core 12A, and the HLR 10A is consulted, the HLR 10A will indicate that a copy of the data relating to the user of mobile terminal 20A was temporarily stored in the VLR 11B associated with the MSC 6B which controls the base station 3B with which mobile terminal 20B is registered in network B. The core 12A of network A then transmits the call initiation message to the core 12B of network B via interconnection 16 (message 10). The message is then routed to the appropriate MSC (MSC 6B) (message 11), and thence to mobile terminal 20 (message 12). When the call is accepted by mobile terminal 20, communication between mobile terminal 1A and mobile terminal 20 can occur in the conventional manner. Although the call is between members of VPN X, the charge for making the call may be higher to reflect that mobile terminal 20 is roaming.

Figure 4:
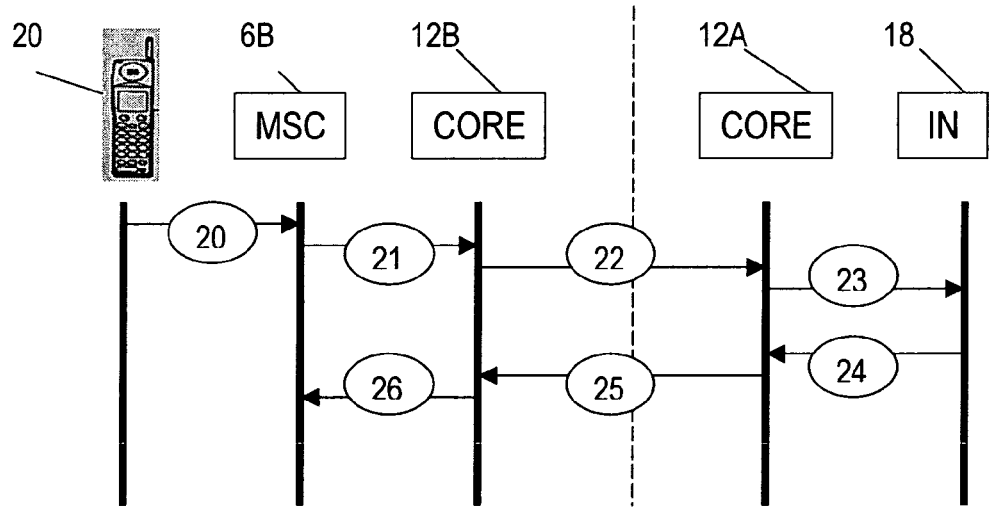
FIG. 4 shows the data exchanges that occur between the elements shown in FIG. 1 when a subscriber to the VPN administered by a home network wishes to make a call to another subscriber of the VPN when the calling subscriber is "roaming".

FIG. 4 shows the call initiation procedure when a call is initiated by roaming mobile terminal 20 to another member of the VPN X.

The call initiation message (message 20) includes the code number of the terminal within the VPN being called—for example, mobile terminal 1A. The call initiation message is received from mobile terminal 20 by MSC 6B (via a wireless link), and is then transmitted (via a fixed or wired link) to the core 12B (message 21). As indicated above, the call initiation message includes a flag which indicates that the message is a message for setting up a call from one member of VPN X to another member of VPN X. This flag is recognized by core 12B, where it is also determined that VPN X is administered by network A. Core 12B then extracts the code number from the call initiation message and sends this to core 12A of network A via interconnection 16 (message 22). The code number is received by core 12A, which consults IN 18 to determine from the look-up table stored therein the MSISDN corresponding to the short code (message 23). The MSISDN corresponding to the short code is then transmitted from the IN18 to the core 12A (message 24). Core 12A then transmits the MSISDN to core 12B via interconnection 16 (message 25). The core 12B then modifies the call initiation message by replacing the code number with the MSISDN provided by IN 18 and sends this to MSC 6B (message 26). The call initiation procedure can then continue as for a conventional call (and will not be described further here for the sake of brevity).

In this specification, MSISDNs are referred to as being stored in the IN18. However, it should be understood that any type of telephone number (or device address) may be stored and used to replace a corresponding code number. For example, the telephone number may be a fixed PSTN telephone number. References in this specification to an MSISDN should be interpreted also to be references to any type of telephone number or device address.

FIG. 5 shows an example of the data stored by IN 18. The IN 18 stores details of code numbers and MSISDNs or telephone numbers for two VPNs: VPN X and VPN Y. Of course, in practice, the IN 18 might store data for a multiplicity of VPNs. For each code number of a particular VPN the IN 18 stores the corresponding MSISDN. Several code numbers may correspond to a single MSISDN (that is, if a subscriber dials two different code numbers, the same MSISDN will be returned).

For example, for VPN X code number "0" corresponds to MSISDN (PSTN telephone number) "0207 225 1000". This might, for example, be the PSTN telephone number of the switchboard of the organization for which VPN X is provided. Other code numbers (4573 . . . 4965) correspond to respective MSISDNs (07771 225 4573 . . . 07771 225 4965). Other code numbers (4990, 4491) correspond to PSTN telephone numbers of another country (in this example Germany).

The IN 18 also lists code numbers and corresponding MSISDNs for VPN Y. The code numbers in VPN Y have a different length to the code numbers of VPN X. It is advantageous for the organization for which a VPN is provided to use its existing extension numbers (for example, used for making internal calls within the organizations fixed telephone network) as code numbers without modification.

As indicated above, the call initiation message from a mobile terminal that is a member of a VPN will include a flag or other identifier which indicates of which VPN the mobile terminal is a member. In addition to the code number being forwarded by the core 12A to the IN 18, this flag or other identifier is also forwarded. This enables the IN 18 to initially identify the relevant VPN, and subsequently, using the code number, to obtain the relevant MSISDN (or other telephone number).

It should be appreciated that while exemplary embodiments of the invention, described below, concern GSM mobile telecommunications systems, the present invention is applicable to any type of mobile or cellular telecommunications system, including a UMTS (3G) mobile telecommunications system.

As described above, the known VPN arrangement can successfully route calls between members of a VPN when those members are roaming in a mobile telecommunications network (that is not hosting the VPN). However, existing systems are inadequate in that it is not possible to route calls dialed using code numbers between members of VPNs hosted or administered by different networks. It is also not possible in such systems to provide a single VPN that includes members from a plurality of networks. Such "different" networks may have separate network cores, controlling the authentication of subscribers and charging for use of the relevant network by subscribers. The different networks may be controlled and operated completely independently from one another, and may be different legal entities. Alternatively, different networks may be commonly owned but may be located in different countries or regions, each network having a respective core for controlling overall operation of that network.

The embodiment to be described enables data from VPNs or private dialing plans hosted by different mobile telecommunications networks to be shared. Selected networks may agree in principle to allow the sharing of data of VPNs hosted thereby. When such an agreement is in place in principle, each network will specify, and only allow sharing of, selected VPNs hosted thereby. Further, there may be some entries of a VPN that are not to be shared between the networks. The IN of each network controls with which (if any) other networks VPN data are shared. By sharing data from VPNs hosted or administered by different networks, a subscriber registered with a VPN hosted by network A can dial a subscriber of a different VPN, hosted by network B, using the short code of the subscriber of the VPN hosted by network B. Such an arrangement is particularly advantageous, for example, when a multinational organization, which has VPNs in several different countries and hosted by different networks (which might perhaps be commonly owned) wishes to provide its employees with the facility to use code numbers to make calls internationally but within the organization. Further, or alternatively, special services and call charges can be provided for such inter-VPN calls.

The embodiment also allows a single VPN to span a plurality of networks. That is, the members of a single VPN may be subscribers to different networks.

Figure 6:
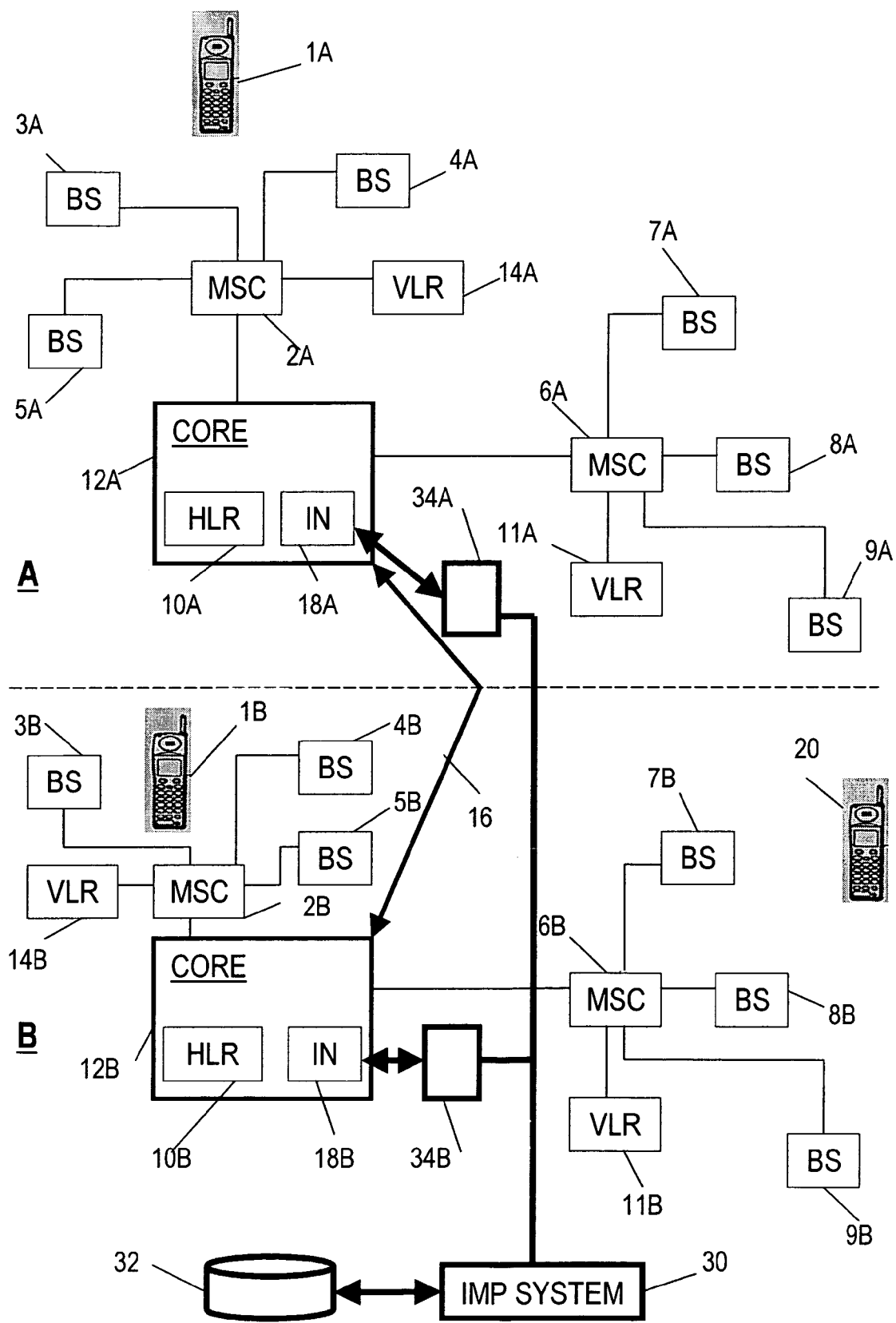
FIG. 6 is a diagrammatic drawing of two mobile telephone networks similar to that of FIG. 1 but showing the additional elements provided in accordance with the invention.

FIG. 6 shows two GSM networks consistent with an exemplary embodiment of the invention. In FIG. 6, by way of illustration, an agreement exists between networks A and B to share data from all the VPNs hosted by each of the two networks. In addition to the components shown in FIG. 1, FIG. 6 further includes an International VPN Mediation and Provisioning system (IMP system) 30. IMP system 30 maintains a database 32 of code numbers and corresponding MSISDNs (E 164 dialable members and/or other telephone numbers or device addresses) from the IN18A and IN18B of networks A and B—i.e. the VPN data stored by each of the networks. Each of the networks A and B is provided with an IMP provisioning adapter 34A, 34B, which provides an interface between the IN 18A, 18B of networks A and B and the IMP system 30.

The IMP system 30 stores a copy of the code number and MSISDN (and/or other telephone numbers or device addresses) data stored in the IN 18A, 18B of each network served by the IMP system 30. The data is stored in database 32 in a predetermined format as an XML file. The format of data stored in the local IN 18A, 18B of each network may be different from this predetermined format. The adapter 34A, 34B of each local network modifies the data stored in the IN 18A, 18B of each network to put it into the predetermined standard format, prior to the data being transmitted to the IMP system 30 and from there to the database 32.

Generally speaking, the IMP system 30 and database 32 will allow a subscriber to one network (network A) to call a subscriber of another network (network B) using a code number of the subscriber of network B relating to a VPN hosted by IN 18B of network B. When the code number is dialed by the subscriber of network A, the call initiation message is passed from mobile terminal 1A via base station 3A to MSC 2A, and from there to network core 12A. The code number is recognized as not being an MSISDN and is passed to IN 18A. The IN 18A in turn recognizes that the code number is not for a VPN that it hosts. What happens next depends upon the implementation of the IMP system 30.

In a first implementation the IN 18A generates a request for the MSISDN corresponding to the code number and sends this to its adapter 34A. The adapter 34A configures this request into the required XML format and transmits this to IMP system 30. The IMP system 30 interrogates database 32 to provide the MSISDN corresponding to the code number and returns this to the IN 18A via the adapter 34A. The IN 18A then returns the MSISDN to the MSC 2A in order to allow the call to continue in the conventional manner.

In a second, preferred, arrangement, the code numbers and MSISDNs of all the VPNs hosted by other networks (network B in this example) with which network A wishes to allow dialing using code numbers are copied to the IN 18A of network A. If such an arrangement is used, the IN 18A will be able to look up the relevant MSISDN for a code number of a VPN which is not hosted by the IN 18A using the downloaded information, without requiring an enquiry to IMP system 30 and database 32 via adapter 34A. Of course, as well as network A receiving a copy of all code numbers and MSISDNs for relevant VPNs hosted by the other networks, those other networks (network B in this example) will also require copies of relevant details from relevant VPNs which they do not host (the VPNs of network A in this example). In this case, the hosting networks of the VPNs remain the master data store for their own VPN data.

Whichever of the two arrangements is used, special services may be provided for, and special charges made be applied to, calls between VPNs hosted by different networks, these being different from services and charges rendered by conventionally dialed calls using MSISDNs. If a call is between subscriber terminals served by VPNs that have an association (that is, VPNs between which an agreement exists to allow calls to be routed therebetween using their code numbers or between which an agreement exists to join VPNs in an association, with or without code numbers), such calls are termed "on-line" calls. Calls which do not use the code numbers and which are not between subscriber terminals of associated VPNs are termed "off-line". Such off-line calls are conventional calls between mobile telephone network subscribers, or between a mobile telephone subscriber and a subscriber to a fixed network. A different rate and services may be offered to a subscriber terminal making an on-line call depending upon whether that call is between subscriber terminals which are a member of the same VPN and where both subscriber terminals are in their home network. A different charge and services may be available when the subscriber terminals are both members of the same VPN but one of the subscribers is roaming in a visited network. A different charging structure and services may again be provided when a call is between two subscriber terminals that are members of different VPNs, and may further vary in dependence on whether the different VPNs are hosted by the same network or different networks, and on the location of the respective subscriber terminals between which the call is made.

In order for the database 32 to be compiled, the IN 18A, 18B of each network must provide its contents to the database 32. As indicated above, provisioning adapters 34A, 34B are operable to arrange the data of each hosted VPN in an appropriate XML predetermined form and this is passed to database 32. The database 32 will be regularly updated with additions, deletions and amendments to the VPNs hosted by each IN 18A, 18B. If the second arrangement described above applies, the copies of the VPN databases downloaded to each IN 18A, 18B from the database 32 will also be periodically updated.

As described above in relation to the conventional arrangement where a mobile telecommunications network provides VPNs for a plurality of organizations, it is necessary that the IN 18A can distinguish between code numbers for the respective VPNs hosted thereby.

In the embodiment described the networks A and B are located in different countries. A convenient arrangement for distinguishing short codes of VPNs associated with network A from those associated with network B is to automatically add to the short codes a uniqueness prefix (such as the standard country dialing code for the country where the VPN is hosted) when the short code is prepared in adapter 34A, 34B for transmission to the IMP system 30. Therefore, the code numbers of VPNs hosted by network A, which is located in the United Kingdom, would all have added to them the prefix "44" by adapter 34A prior to them being transmitted to IMP system 30. The short codes of VPNs hosted by network B, which is located in Germany, would automatically have the prefix "49" added to them by adapter 34B prior to them being transmitted to IMP system 30. The uniqueness (country code) prefix is in addition to the optional prefix that uniquely identifies each code number as a member of its VPN within the network hosting the VPN (if such a prefix is used).

In the discussion hereinafter, an implementation of the second arrangement referred to above, where the IN of each network maintains a copy of VPN data from each of the associated VPNs hosted by other networks, will be described. VPN data are "pushed" from each IN (IN 18A and IN 18B) to the IMP system 30 in two primary ways. Data may be pushed selectively. For example, when a new member joins a VPN hosted by network A, the relevant information (short code, MSISDN, country code and VPN identifier) are pushed to the IMP system 30. An alternative updating mode is where the entire content of the IN, or of a particular VPN hosted by the IN, is pushed to the IMP system 30. This mode will be used when initially setting up the IMP system 30 (because it will have no record of any entries of the IN of network A). This mode may subsequently be used to perform a reconciliation of the data stored by the IN of network A and the data for network A stored by the IMP system 30. If there are any discrepancies between the data these can be identified and resolved.

The IN of each network will also need to "pull" data relating to VPNs hosted by other networks from IMP system 30. Again, this pulling of data may be either performed selectively, or all the data held for a particular VPN or IN (or a proportion of that data) may be downloaded—the latter mode being used typically during system set up and to perform a reconciliation operation of the type described above in relation to a data push by an IN.

The database 32 is a relational database and includes relevant provisioning data for all VPNs. The database stores a corresponding code number, telephone number (or the like), VPN identifier and country code for each entry.

FIG. 9 shows an example of the data stored in the database 32. FIG. 10 shows an example of the corresponding data pulled by the IN 18A of network A.

As well as storing the code numbers, telephone numbers, etc., the database 32 also stores data indicating when entries therein were last updated, and when data from the database 32 has last updated the corresponding information stored at the IN of each relevant network. This information can be used to allow selective updating of the data stored at the IN of each relevant network.

The provisioning adapter 34A, 34B of each network is responsible for all communication between the IN 18A, 18B of that network and the IMP system 30. The provisioning adapter is a single Java application. The provisioning adapter includes a scheduler which triggers pull and push operations according to a pre-programmed and configurable schedule. In addition to allowing pull and push operations, as described above, the provisioning adapter also performs an archive operation, where the provisioning adapter periodically moves data stored in the IN to an archive store where the data is stored in compressed form.

The provisioning adapters communicate with a central system 30 by exchanging XML formatted files. The file transport protocol is SCP (Secure Copy Protocol). This protocol uses the encryption and authentication of secure shell (SSH). Secure shell is an industry standard for establishment and maintenance of secure connections. It uses DES and RSA algorithms for private/public key management. Transferred data is encrypted and protected from manipulation. Secure shell tunneling protection is equivalent to that provided by an IP virtual private network. Secure shell uses standard IP routing and it can also run within an IP virtual private network. All file transfer operations are initiated by the adapters 34A, 34B.

The tunnel is established only for the time needed to perform pull, push or archive operations. After these operations are completed, the tunnel is dismantled. This allows the system to operate using, for example, ISDN connections, which are established only when needed. The SSH server has a host certificate that must match the relevant entry in the IMP system 30 which stores details of each known adapter 34A, 34B. The IMP system 30 stores a public key associated with each adapter 34A, 34B to authorize access. Each adapter 34A, 34B will use its own private key to access the IMP system 30. Each adapter will store an IMP system 30 host certificate in its known hosts list.

As a security measure, the IMP system may be configured such that it will only allow an IN 18A to pull data from the database 32 if that IN 18A has previously pushed data.

Figure 7:
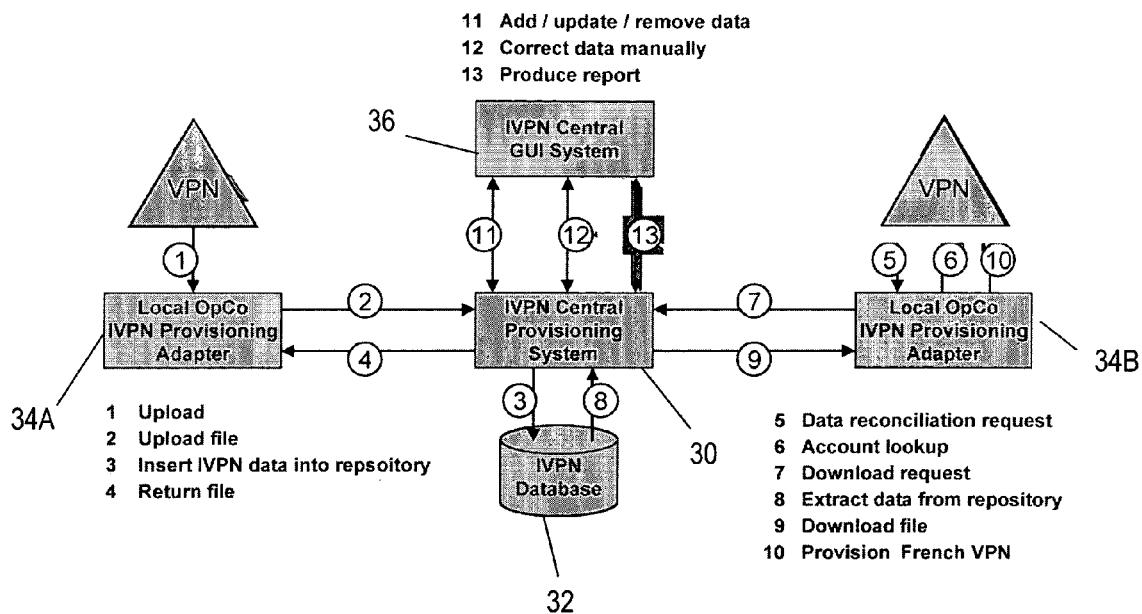
FIG. 7 shows in more detail the connections between a central VPN database and the elements of networks A and B shown in FIG. 6 and the data exchanges occurring therebetween.

As shown in FIG. 7 the IMP system 30 is provided with a graphical user interface (GUI) 36 for monitoring operation of the IMP system 30, fault tracing and manual connection to adapters 34A, 34B.

With reference to FIG. 7, an example will now be described of the data flows when network A uploads data to the IMP system 30 and network B downloads data.

Data flow 1: Network A, by means of IN 18A, provides VPN data of its subscribers to the adapter 18A. The network A specifies update (add or modify) and remove operations to carry out on the data stored by the IMP system 30. The update may be either a selective (differential) update or a complete or partial reconciliation of data concerning the VPN.

Data flow 2: The adapter 34A uploads the data to the IMP system 30. The adapter 34A performs all communication and error handling with the IMP system 30.

The IMP system 30 will check that each code number and MSISDN received is valid. This may be done by a separate communication path to the relevant network which hosts the code number and the MSISDN. The database 32 will only be updated (see data flow 3 below) with valid code numbers and MSISDNs. For any code numbers or MSISDNs that are not valid, a report will be produced and returned to the adapter 34A (data flow 4 below).

Data flow 3: The IMP system 30 updates its database 32 according to the data received from the network A.

Data flow 4: The IMP system 30 returns to the adapter 34A a report of the success or failure of each update operation.

When network B wishes to download VPN data, the following data flows occur.

Data flow 5: Network B, by means of its IN 18B, requests from its adapter 34B a download of some specified provisioning data relating to VPNs of other networks. Such requests may be scheduled periodically, or triggered manually by an operator. The requests may be for either a selective/differential update or for a full or partial reconciliation.

Data flow 6: The adapter 34B determines the VPNs of other networks with which network B has an association (i.e. between which inter-VPN or on-net calls may be made) and for which relevant provisioning data should be downloaded.

Data flow 7: The adapter 34B initiates a download from the IMP system 30, specifying a list of VPNs from which data are required. The adapter 34B performs all communication and error handling with the IMP system 30.

Data flow 8: The IMP system retrieves the relevant data for the VPNs from its database 32. The data includes code numbers, telephone numbers for the entries of all relevant VPNs except the VPNs hosted by network B.

Data flow 9: The IMP system 30 returns the requested data to the adapter 34B.

Data flow 10: The adapter 34B returns the requested data from the VPNs of other networks to the IMP of network B.

The GUI 36 allows the inter-network VPN service 30 to be managed as follows.

Data flow 11: The GUI system 36 can add, update and remove configuration data from the IMP system 30, such as valid participating networks and VPN accounts.

Data flow 12: The GUI system 36 can correct data in the IMP system 30 database.

Data flow 13: The GUI system 36 can generate reports from the IMP system 30 database.

Figure 8:
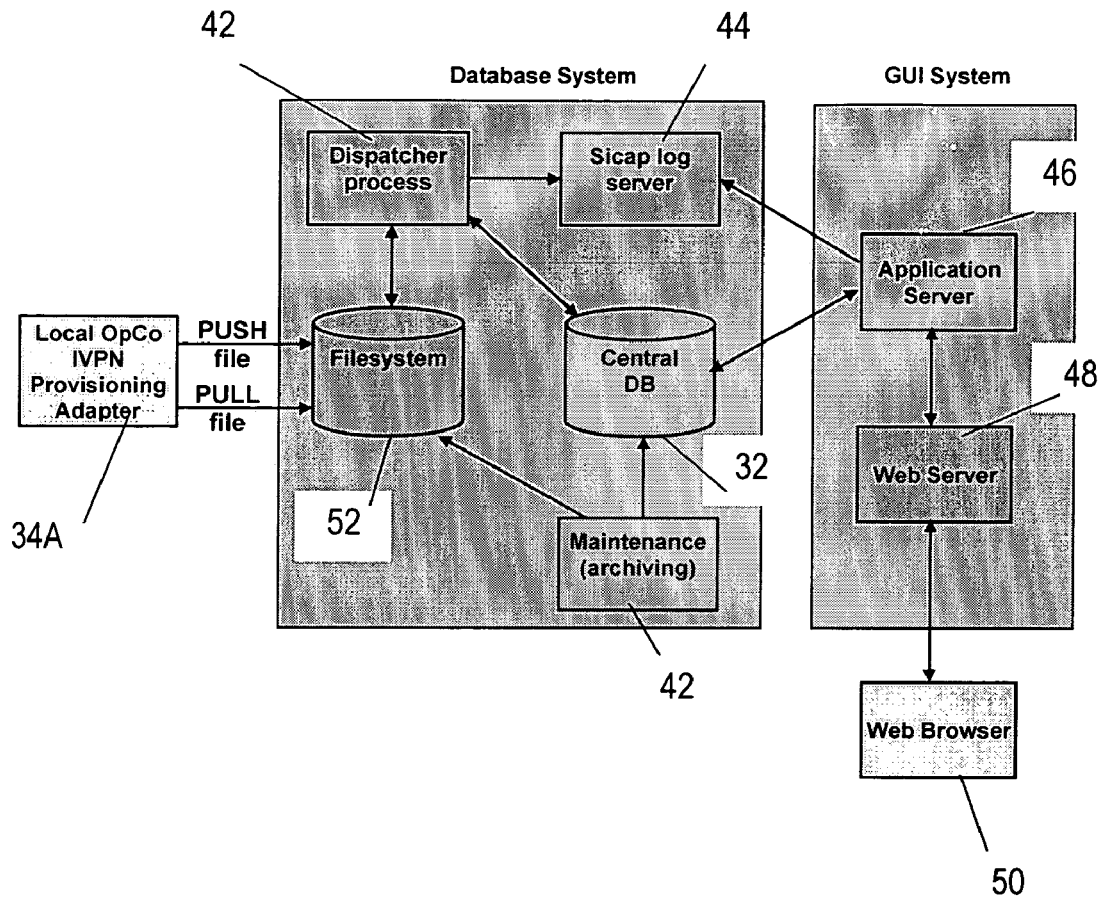
FIG. 8 shows the architecture of the central VPN database.

The architecture of the IMP system 30 is shown in FIG. 8. The dispatcher process module 40 is responsible for decoding XML requests or uploaded files received from the adapter of a network (in this example adapter 34A of network A). The dispatcher process 40 also updates the database 32 according to the uploaded files received and prepares XML return files for sending to the adapter 34A.

Maintenance (archiving) module 42 is responsible for archiving and purging old or obsolete XML files and purging odd entries from a store of past pull and push operations.

The log server 44 is responsible for writing log entries generated by all the components of the IMP system 30 to log files.

The application server 46 of the GUI system 36 provides for database access and associated business logic, and XML style sheets. Web server 48 and web browser 50 provide a convenient means for implementing the graphical user interface from the GUI system 36. File system 52 manages pull and push requests from adapter 34A.

The following is a summary of exemplary characteristics concerning the push/pull of information between networks and IMP system 30:

IMP works with a push and pull mechanism.

Networks push their own numbers to the IMP, formatted with the global uniqueness prefix, and assigned to a customer account (a particular VPN).

Networks pull numbers for the customer accounts that they own. Networks cannot pull numbers for customer accounts that they are not assigned to.

Networks can push or pull selected groups of numbers:
  Numbers belonging to one or more customer accounts.
  Numbers belonging to one or more networks.

Various push/pull actions are possible:
  Push-update (add or replace a number).
  Pull (retrieve a number pushed by another network).
  Delete number.
  Reconciliation pull (network may pull all or a subset of all the data that they have previously pushed to the IMP, in order to verify it).
  Reconciliation push (network pushes data to the IMP, which deletes and replaces all data previously pushed by that network for a particular customer account).

Referring now to FIG. 10, the content of the IN 18A of network A is shown after that IN 18A has pulled relevant data from two VPNs (VPN $M_B$ and VPN $N_B$ from another network (network B) with which there is an agreement to allow inter-VPN VPN on-net calling. The code numbers of VPN $M_B$ include a unique VPN identifier "2" and, in this case, the country code "49" (referring to the country (Germany) where the VPN is hosted). These digits precede the basic code number "12340 . . . 12347". Similarly, the code numbers of VPN $N_B$ have a unique VPN identifier "4" and the country code "49" preceding the relevant basic code number "1 . . . 8". As discussed above, the "unique" VPN identifier is unique within that VPN's host network, but it might be repeated in another network.

The code numbers of VPN X and VPN Y, which are hosted by network A (and in FIG. 10 are designated VPN $X_A$ and VPN $Y_A$) can be considered to be "local" VPNs. These will not have added to them a unique VPN identifier or a country code. When the data of VPN $X_A$ and $Y_A$ are uploaded to IMP system 30, the adapter 34A will add a relevant unique VPN identifier and country code in order to put the VPN data in the required format for IMP system 30.

It should be understood that any network may host VPNs which are only required locally within that network, and where details of which are never passed to IMP system 30.

Because the code numbers of the local VPNs (VPN $X_A$ and VPN $Y_A$ are not processed by adapter 34A and IMP system 30, and are not provided with a unique VPN identifier and country code, it is possible that a code number used by a local VPN is the same as the code number used in pulled VPN data. In FIG. 10 the last entry of the left hand column for VPN $X_A$ has a code number "4491". The first code number of VPN $N_B$ is also "4491", although the latter code number comprises unique VPN identifier "4", country code "49" and basic code number "1".

Such a situation may be dealt with in a variety of different ways. The IN 18A may monitor for any clash between code numbers of different VPNs and produce a report which prompts manual intervention. For example, a message could be sent to network B, and in particular to the person responsible for administering VPN $N_B$ indicating that the subscriber with basic code number "1" of VPN $N_B$ must change that code number or they will not be able to access VPN $N_B$ when roaming in network A. If the conflict is not resolved, the IN 18A of network A will, on receipt of the code number "4491" in a call initiation message, assume that this is the code number of the local VPN $X_A$ and return the telephone number +49 89 2399 4991".

FIG. 9 shows the data present in IMP system database 32 following pushing of data for VPN $X_A$ and $Y_A$ from network A and from VPN $M_B$ and VPN $N_B$ from network B. The clash between code numbers described in relation to FIG. 10 does not occur because the code number "4491" of VPN $X_A$ has added to it the unique VPN identifier "1" and the country code "44".

The database 32 does however monitor for clashes of code numbers when VPN data is being pushed from a network. If database 32 detects a clash between code numbers or MSISDNs within a VPN association, this is reported using GUI 36 and in xml return files and user intervention in the pushing network is required to prevent two code numbers being present on database 32 that clash.

FIG. 11 illustrates an alternative, but similar, arrangement to FIG. 10—like features are assigned like reference signs. The content of the IN 18A of network A is shown after that IN 18A has pulled relevant data from two VPNs (VPN $X_B$ and VPN $Y_B$) from another network (network B): VPN $X_B$ having an agreement to allow inter-VPN on-net calling with VPN $X_A$ on network A and VPN $Y_B$ having an agreement to allow inter-VPN on-net calling with VPN $Y_A$ on network A. The code numbers of VPN $X_B$ include an identifier (which in this case is the country code "49" of the country (Germany) where VPN is hosted). The digits of the identifier precede the basic code number "60 . . . 67". Similarly, the code numbers of VPN $Y_B$ have an identifier "49" preceding the relevant basic code number "1 . . . 8". It is to be noted that VPNs are generally distinguished within the IN by separate identifiers that are not included in the code numbers. These separate VPN identifiers are unique within that VPN's host network (here network B), but might be repeated in another network.

The code numbers of VPN X and VPN Y, which are hosted by network A (and in FIG. 11 are designated VPN $X_A$ and VPN $Y_A$) can be considered to be "local" VPNs. No (country code) identifier will prefix such "local" code numbers when they are stored on the IN 18A. When the data of VPN $X_A$ and $Y_A$ are uploaded to IMP system 30, the adapter 34A will add a relevant identifier (for example, an identifier equivalent to the country code) in order to put the VPN data in the required format for IMP system 30.

It should be understood that any network may host VPNs which are only required locally within that network, and where details of which are never passed to IMP system 30.

Because the code numbers of the local VPNs (VPN $X_A$ and VPN $Y_A$ are not processed by adapter 34A and IMP system 30, and are not provided with a (country code) identifier, it is possible that a code number used by a local VPN is the same as the (prefixed) code number used in pulled VPN data. In FIG. 11, the third from last entry of the left hand column for VPN $X_A$ has a code number "4965". However, one of the code numbers of VPN $X_B$ is also "4965", although the latter code number comprises identifier (country code) "49" and basic code number "65".

Such a situation may be dealt with in similar ways to the analogous situation, discussed in relation to FIG. 10.

Figure 12:
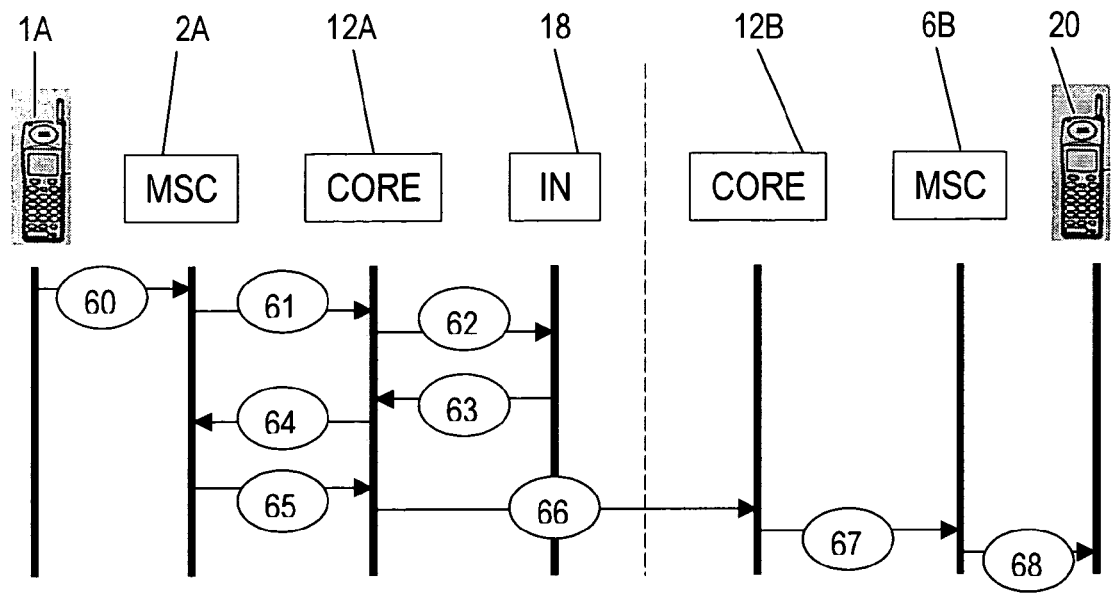
FIG. 12 shows the exchange of data between the elements shown in FIG. 6 when a subscriber of a VPN administered by a one network calls a subscriber of a VPN administered by another network.

The exchange of data taking place between the elements shown in FIG. 6 which occurs during initiation of a call from mobile terminal 1A which is a member of VPN $X_A$ hosted by network A to mobile terminal 20 which is a member of VPN $M_B$ hosted by network B, and dialed by mobile terminal 1A using the short code for mobile terminal 20, will now be described with reference to FIG. 12.

The user of mobile terminal 1A will be aware that mobile terminal 20 is not a member of the same VPN as mobile terminal 1A. The user of mobile terminal 1A will know that the VPN of which mobile terminal 20 is a member is hosted in Germany, and will therefore precede the code number by the country code for Germany "49".

A call initiation message 60, which will include the code number dialed by the user of mobile terminal 1A, is transmitted wirelessly from mobile terminal 1A to MSC 2A. The initiation message is then transmitted from MSC 2A to core 12A (message 61). The initiation message includes a flag or other identifier which indicates that the call being initiated for a particular VPN (VPN $M_B$). This flag is identified by core 12A. On identification of the flag, the core 12A transmits the code number extracted from the initiation message to the IN 18A (message 62). The IN 18A then consults the data stored therein to locate the relevant entry for the code number received. For example, if the code number of mobile terminal 20 is "12340", the IN 18A will then initially search data stored for its local VPNs (that is, VPNs that it hosts). If, as in this case, the code number is not identified as being one of a local VPN, the search is then extended to code numbers of VPNs previously pulled by the IN 18A from the IMP system 30 using adapter 34A. The IN 18A will identify code number 12340 stored for VPN $M_B$ and will obtain the relevant MSISDN "+49 65 4521 2340". The MSISDN is returned to the core 12A (message 63), and this is transmitted from the core 12A to the MSC 2A (message 64). The MSC 2A then modifies the call initiation message to include the MSISDN of the called mobile terminal 20 in place of the code number. The modified call initiation message is then transmitted to the core 12A (message 65), where it is handled in a similar manner to any other telephone call initiated using a conventional MSISDN. However, the flag indicating that the call is for a member of VPN $M_B$ is used by the core 12A to identify and make available any special services which it has been agreed will be provided to calls between VPNs $X_A$ and $M_B$, and also to charge for the call according to the charging structure agreed between those VPNs. The core 12A will identify from the structure of the MSISDN that the call is for a mobile terminal that is a subscriber of network B. The core 12A of network A then transmits the call initiation message to the core 12B of network B via interconnection 16 (message 66). The message is then routed to the appropriate MSC (MSC 6B) (message 67), and thence to mobile terminal 20 (message 68). When the call is accepted by mobile terminal 20, communication between the mobile terminal 1A and the mobile terminal 20 can occur in the conventional manner.

If mobile terminal 1A is instead roaming in network B, IN 34B of network B will enable the successful routing of inter- and intra-VPN calls by virtue of the data provided thereto by IMP system 30.

The use of the country codes described above is not necessary if the code numbers used by all VPNs are unique and there is no duplication of code numbers.

The IN of each network may be arranged so that, if the code number of a member of a VPN hosted by that network is dialed by a subscriber to that network but also including the prefix used for calling that code from another network, the call will still be successfully routed. For example, if the code "4573" of a member of VPN $X_A$ (FIG. 10) is prefixed with the country code "44" for network A by a caller registered with network A, IN 18A will be able to route the call to MSISDN 07771 225 4573 in the same manner as if the caller had simply dialed the short code "4573" without the prefix.

As mentioned above, a simple VPN may span a plurality of networks. That is, some members of a VPN may be registered with network A as their home network, and other members of the VPN may be registered with network B as their home network. The codes of the VPN members registered with network A will have the prefix "44" added thereto (for dialing from outside network A, but can also be dialed from inside network A with this prefix) and similarly, the codes of the VPN members registered with network B will have the prefix "49" added thereto (for dialing from outside network B, but can also be dialed from inside network B with this prefix).

In the embodiments described above, members of a VPN all have a (short) code that can be used to call that VPN. Intra VPN calls may be charged at special call rates and/or special services may be provided for such calls. In a modification, short codes are not used. Instead, VPN members are called using their MSISDN. However, membership of the VPN is detected by the relevant network's IN, so that special call rates and/or special services may be provided for such calls (even though short codes are not used). The membership of the VPN of the called party may be detected by adding a flag or other identifier to the called member that is interpretable by the network core, or by some other mechanism. For example, a look-up table of MSISDNs that are members of the VPN could be consulted every time a call is received by the core to determine whether the call is for a member of the VPN. The look-up table may be stored in the IN of each network. The IMP system 30 maintains the look-up tables in a similar manner to that described above (where short codes are provided) except, of course, the records need not include short codes, but only MSISDNs and VPN membership data.

It should be appreciated that the invention is also applicable to an arrangement where some or all of the networks A and B are not cellular telecommunications networks but are some other type of communications network. For example, one or more of the networks could be a satellite communications network. There may be more than two networks.

The networks A, B are separate or discrete in the sense that they have a separate core for routing data between devices registered therewith and/or in the sense that they do not share a radio access network/base station transceivers. The networks may be operated by different (legal) entities and/or have separate facilities for authenticating user devices and charging users of devices registered therewith for use of the network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A communications system, comprising:
   a plurality of telecommunications networks, each of which:
   provides subscriber terminals thereof with a respective publicly-known telephone number for allowing communications to be addressed to each subscriber terminal,
   allows selected subscriber terminals thereof to be associated together in a group such that those subscriber terminals can address communications to one another using a respective code allocated to each of the selected subscriber terminals; and includes an intelligent node configured to correlate the code of each of the selected terminals into the corresponding publicly-known telephone number thereof; and an International VPN Mediation and Provisioning (IMP) system for maintaining a database of the codes and corresponding publicly-known telephone numbers of all of said networks and for providing to one of said networks a publicly-known telephone number corresponding to a code of a subscriber terminal of another one of said networks to allow communication from a subscriber terminal of said one of the networks to be addressed to a subscriber terminal of said other of the networks using the code of the latter subscriber terminal.

2. The system of claim 1, wherein each network is provided with a respective IMP provisioning adapter for exchanging data with the IMP system.

3. The system of claim 2, wherein each IMP provisioning adapter is operable to transmit data indicative of its network's codes and corresponding publicly-known telephone numbers to the IMP system.

4. The system of claim 3, wherein each IMP provisioning adapter is operable to generate said data in a predetermined format for use by the IMP system.

5. The system of claim 4, wherein each IMP provisioning adapter is operable to generate said data using XML.

6. The system of claim 2, wherein each IMP provisioning adapter is operable to receive data indicative of codes and corresponding publicly known telephone numbers of other ones of said networks from the IMP system.

7. The system of claim 6, wherein said IMP system is operable only periodically to provide the data indicative of said codes and said corresponding publicly known telephone numbers to the intelligent node.

8. The system of claim 6, wherein each IMP provisioning adapter is operable to provide the received data indicative of said codes and said corresponding publicly known telephone numbers to the intelligent node such that the intelligent node is able to route a communication identified by one of the said codes without reference to the data stored on the IMP system.

9. The system of claim 1, wherein the subscriber terminals associated with the group belong to two or more networks.

10. The system of claims 1, further comprising means for modifying said codes to provide them with an indicator of the group and/or network with which they are associated.

11. The system of claim 1, further comprising an intelligent node for detecting two identical codes.

12. The system of claim 1, wherein said group comprises a virtual private network (VPN).

13. The system of claim 1, further comprising a core for identifying communications initiated using a said code and for applying a special charging or service scheme to such communications.

14. The system of claim 1, wherein the system is configured to determine whether a call between subscriber terminals is an on-line call, and is further configured to apply a special service scheme to said call where it is determined that the call is on-line.

15. The system of claim 14, wherein the call is initiated by a subscriber terminal that is associated with a given group of subscriber terminals and wherein the determining means is operable to detect whether the communication was initiated using a code allocated to a subscriber terminal associated with said given group, thereby determining whether the call is on-line.

16. The system of claim 14, wherein the given group comprises a virtual private network (VPN) and each subscriber terminal participating in said call belongs to the same VPN.

17. A method of enabling communication between a plurality of telecommunications networks, the method including:

providing subscriber terminals of each network with a respective publicly-known telephone number for allowing communications to be addressed to each subscriber terminal;

associating selected subscriber terminals of each network together in a group such that those subscriber terminals can address communications to one another using a respective code allocated to each of the selected subscriber terminals; and maintaining a database of the codes and corresponding publicly-known telephone numbers of all of said networks and providing to one of said networks a publicly-known telephone number corresponding to a code of a subscriber terminal of another one of said networks to allow communication from a subscriber terminal of said one of the networks to be addressed to a subscriber terminal of said other of the networks using the code of the latter subscriber terminal.

18. A communications system, comprising:

a plurality of telecommunications networks; and an IMP system, wherein the communications system:

provides subscriber terminals thereof with a respective publicly-known telephone number for allowing communications to be addressed to each subscriber terminal;

allows selected subscriber terminals thereof to be associated together in respective groups; and is configured to determine whether a communication from a terminal is for a member of a particular one of said groups, and wherein the IMP system maintains a database of the groups for each of said networks and enables at least one of special charges and services to be provided for communications between at least one of members of the same group and members of different groups.

19. The system of claim 18, wherein each network is provided with a respective IMP provisioning adapter for exchanging data with the IMP system.

20. The system of claim 18, wherein the subscriber terminals associated with each group belong to two or more networks.

21. The system of claim 18, wherein said groups each comprise a virtual private network (VPN).

22. The system of claim 18, wherein the system is configured to determine whether a call between subscriber terminals is an on-line call and is configured to apply a special service scheme to said call where it is determined that the call is on-line.

* * * * *